May 19, 1970     D. J. McLAUGHLIN     3,512,890
OPTICAL GYROSCOPE HAVING MEANS FOR RESOLVING
AMBIGUITIES OF VELOCITY AND DIRECTION
Filed July 27, 1965     8 Sheets-Sheet 4

INVENTOR
DONALD J. McLAUGHLIN

BY

ATTORNEY

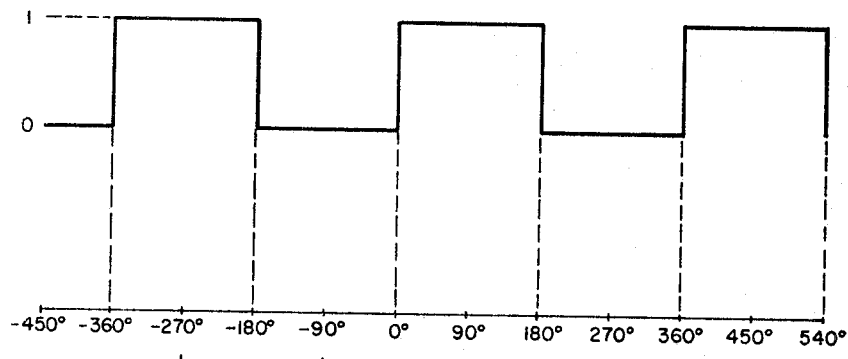

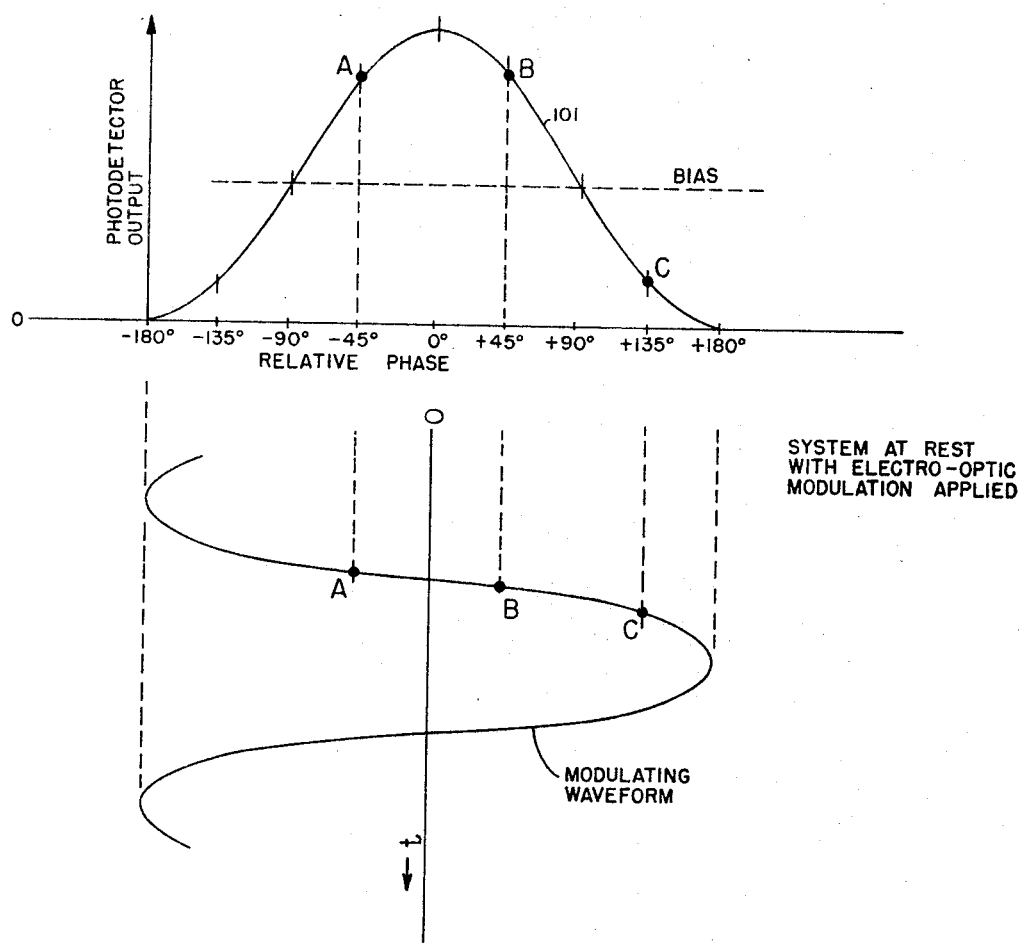

FIG. 6d
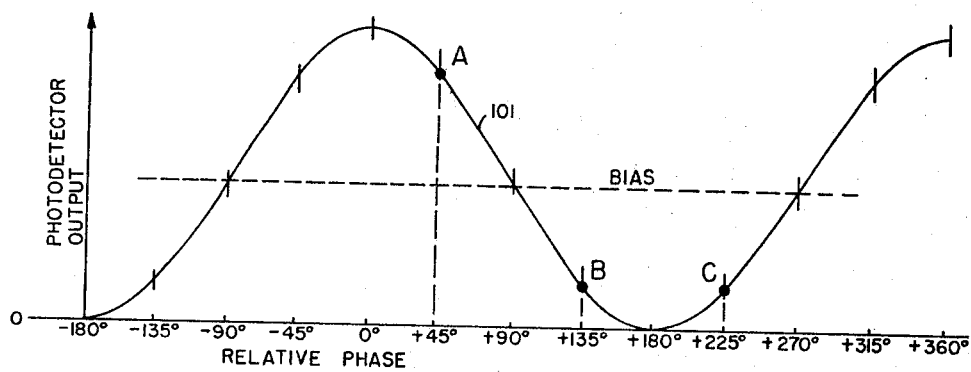
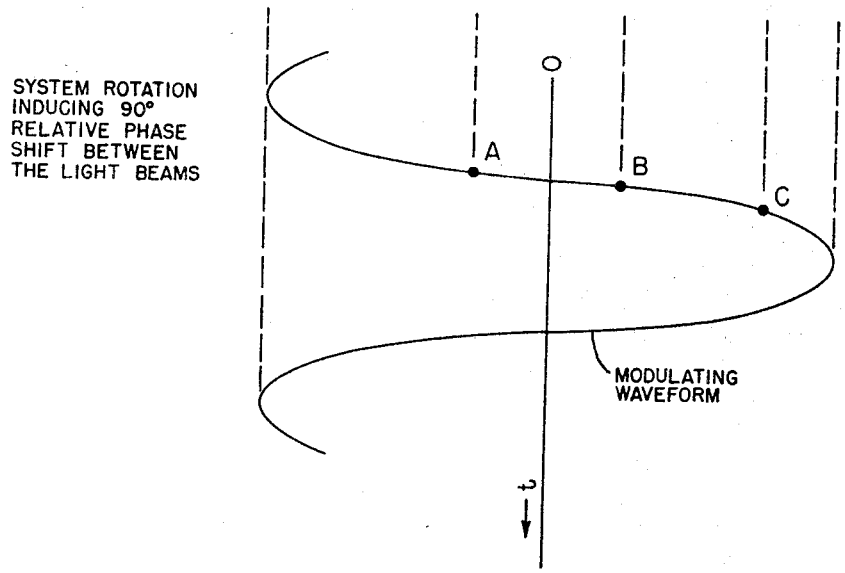

United States Patent Office 3,512,890
Patented May 19, 1970

3,512,890
OPTICAL GYROSCOPE HAVING MEANS FOR RESOLVING AMBIGUITIES OF VELOCITY AND DIRECTION
Donald J. McLaughlin, 3730 Camden St. SE., Washington, D.C. 20020
Filed July 27, 1965, Ser. No. 475,293
Int. Cl. G01b 9/02; G01c 19/00
U.S. Cl. 356—106                    12 Claims

ABSTRACT OF THE DISCLOSURE

An interferometric counterrotating light beam optical gyroscope having an optical phase modulator for the light beam, coupled to and synchronized with a series of gates to allow the phase modulated light beam interference pattern to be transmitted to a comparison circuit which computes the amplitude of the detected light signals at successive gated time periods and thereby provides an unambiguous indication of both rate and direction of rotation of the gyroscope.

---

The invention described herein may be manufactured and used by or for the Government of the United States of America for governmental purposes without the payment of any royalties thereon or therefor.

The present invention relates generally to a system for measuring the rate of rotation or annular velocity as well as direction of rotation of a system and in particular to an optical gyroscope wherein the rate of rotation and direction of rotation of a system are unambiguously determined. The system may be used wherever conventional gyroscopes are employed, especially in the guidance of ships, planes, missiles, and space vehicles.

Conventional gyroscopes depend greatly on the movement of mechanical parts. The most accurate mechanical gyroscopes are always prone to slight errors or drift primarily due to instability and imperfection of mechanical components. A highly accurate and sensitive optical gyroscope has long been needed which also features a direction sensing means for indicating the direction of rotational motion. In the past, interferometer-type rotation sensors have been employed. However, the low accuracy and sensitivity of the devices made them inadequate. Furthermore, the indication produced by those devices is ambiguous since velocity and direction of velocity cannot be determined from the resultant indication.

The general purpose of this invention is to provide an optical gyroscope which embraces all the advantages of prior art gyroscopes and rotation sensing devices and which possesses none of the aforedescribed disadvantages. The device is extremely sensitive and accurate. It has no moving parts for sensing motion or direction and is capable of exceeding the accuracy of top quality mechanical gyroscopes. It is insensitive to linear acceleration and has no practical upper limit for measuring rotation. Light beams are utilized to sense rotation and direction. Since light beams are unaffected by the linear motion of the system or the pull of gravity, the system of the present invention is free of the common source of errors which are present in conventional mechanical gyroscopes. The system is self-contained, requires no external references for either rate of rotation or direction of rotation measurements, and has means for unambiguously indicating angular vlocity and direction of rotation. To attain this the present invention contemplates an optical gyroscope having a source of collimated, coherent, monochromatic light external to a three mirror triangular interferometer wherein light from the souce is passed through a beam splitting mirror to two other completely reflecting mirrors, thereby forming a ring. Light directed into the system travels the exact path length for either clockwise or counterclockwise directions from the beam-splitting mirror around the ring and is then detected. Rotation of the system causes the phase of the two beams to be different at the detector. Direction sensing is provided by changing the path length for both beams with respect to each other. The two beams are continuously phase modulated in a manner detectable by a gating and comparison circuit whose output is unambiguously indicative of both the rate of rotation of the system and also the direction of the rotation.

An object of the present invention is the provision of a novel optical gyroscope having extremely high accuracy and sensitivity.

Another object is to provide an extremely accurate and highly sensitive optical gyroscope which employs a minimum of reflecting mirrors and a single light source.

A further object of the invention is to provide an extremely accurate and highly sensitive optical system which indicates rate of rotation together with the direction of rotation unambiguously.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGS. 5a and 5b illustrate the relationship between the A–B comparator and the B–C comparator of the gating and comparison circuit; and FIGS. 6a through d illustrate photodetector outputs for various conditions of modulation and rotation.

Figure 1:
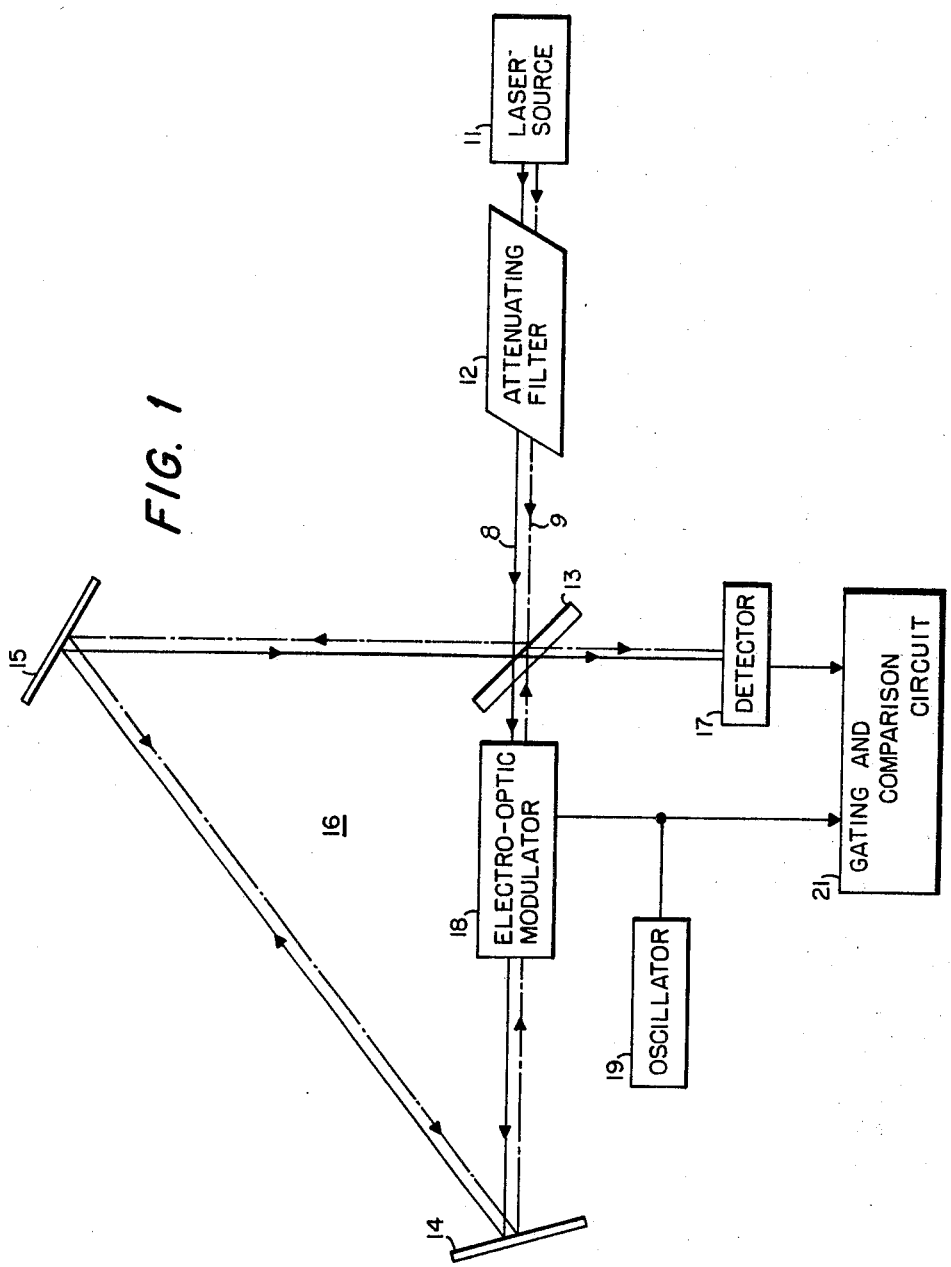
FIG. 1 is a diagram of the rotation sensing system of this invention.

Referring now to the drawings, there is shown in FIG. 1 an interferometer comprising a laser source 11 for emitting a beam of light through attenuating filter 12 toward semi-silvered beam-splitting mirror 13 having a transmission and reflection coefficient of about 50%. Any other suitable light source may be used in place of laser source 11. However, for optimum results where high accuracy and sensitivity are desired, a laser is utilized to produce a collimated, coherent, monochromatic light beam. Totally-reflecting mirrors 14 and 15 are fixed and positioned with respect to beam-splitting mirror 13 so that a light beam entering the system will be reflected around an optical triangular ring 16. The path configuration need not be triangular and may be of quadrilateral or any other suitable configuration.

Attenuating filter 12 is an optical impedance which essentially isolates the light source from light emanating from the ring in the direction of the light source so that interference with the light emanating from the source is virtually eliminated. Filter 12 has slanted faces so that unwanted reflections are directed away from the system. As an alternative to the slanted faces, anti-reflection coatings may be applied to geometrically normal faces.

Beam-splitting mirror 13 is equally transmitting and reflecting so that one-half (beam 8) of the beam directed toward mirror 13 is transmitted through mirror 13 toward mirror 14 and the other one-half (beam 9) is reflected by mirror 13 towards mirror 15. Mirrors 14 and 15 are totally reflecting mirrors. A light detector or photodetector 17 is aligned to receive the beams of light which emanate from the optical ring through beam-splitting mirror 13.

The system operates so that the path-length of one of the beams 8 or 9 is charged with respect to the other differentially in time, or pemanently. To change the path-length differentially in time a suitable electro-optic cell illustrated in FIG. 1 as electro-optic modulator 18 is a asymetrically positioned in the optical path of the interferometer ring 16 between mirrors 13 and 14. The modulator 18 is excited by the signal from oscillator 19 which causes a change in the optical path length at a rate whose cycle period is from 10 to 100 times as long as the time required for the light beam to travel around the interferometer circuit once, thereby phase modulating the two beams in a manner detectable by gating and comparison circuit 21 wherein the oscillator signal is used as a detection reference. A conventional postassium-dihydrogen-phosphate crystal (KDP) may be used for the electro-optic phase modulating device 18. Such crystal changes the phase of light passed through it when voltage is applied to electrodes placed across the crystal.

In certain applications, it may be desirable to combine the functions of beam-splitter 13 and electro-optic modulator 18 by utilizing a single device such as an oscillating electro-optic cell, having a beam-splitting coating, to be substituted for mirror 13. Such device performs essentially the same function as the transmission-type crystal because of its ability to change the path-length for the reflected beam only (of FIG. 1) at a cyclic rate. A further variation comprises combining electro-optic modulator 18 and fully-reflecting mirror 14 as a single oscillating electro-optic cell substituted for mirror 14.

Figure 2:
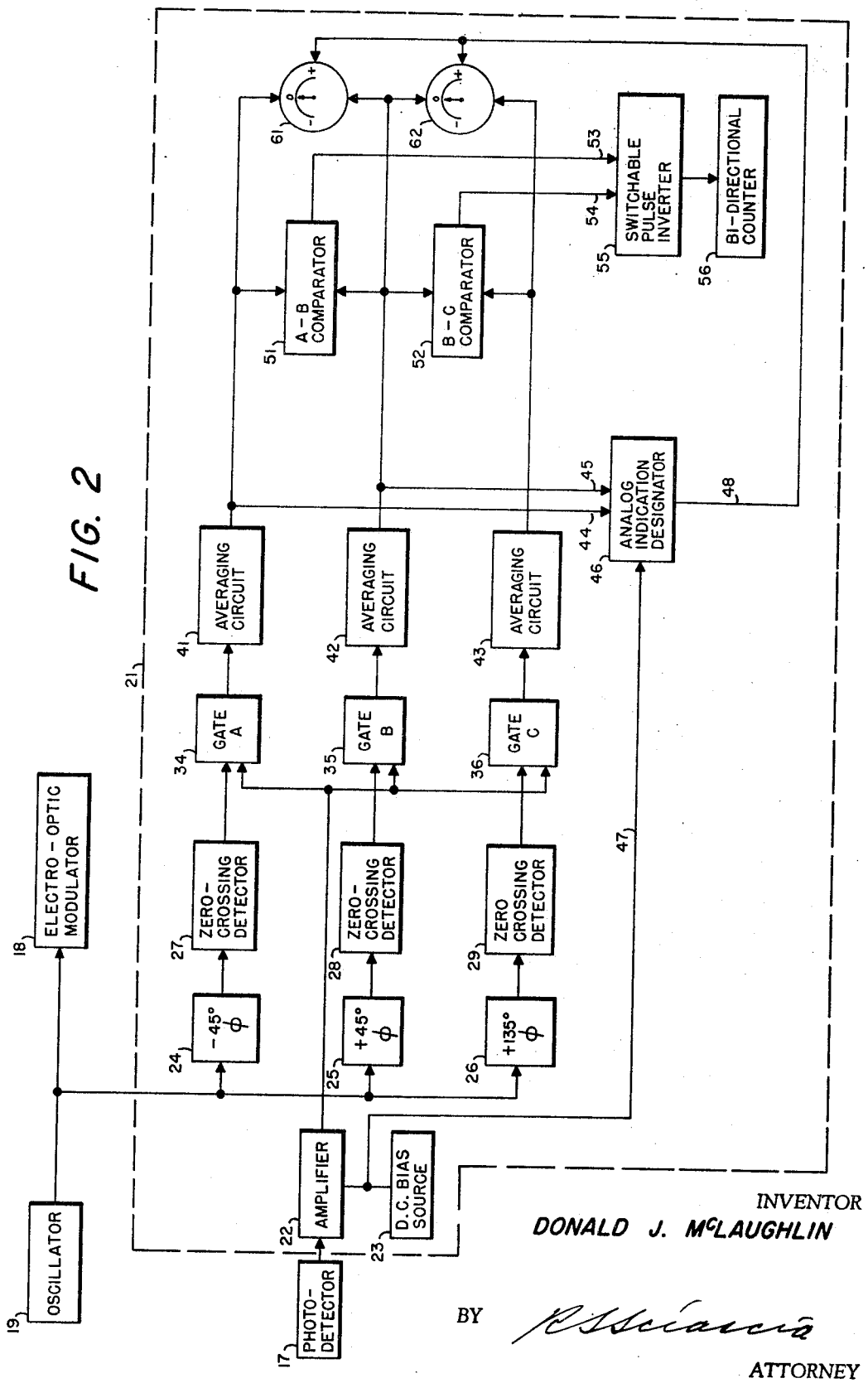
FIG. 2 is a block diagram of the gating and comparison circuit of this invention.

FIG. 2 is a circuit diagram of an embodiment of the angular rate and direction sensing circuitry for the optical gyroscope of FIG. 1 including the specific circuitry of block 21 of FIG. 1. Electro-optic modulator 18 is asymmetrically positioned in one leg of the interferometer of FIG. 1 near beam-splitting mirror 13. Modulator 18 is driven by fixed-frequency oscillator 19 which is also connected to $-45°$ phase shifter 24, $+45°$ phase shifter 25, and $+135°$ phase shifter 26. The phase shifted oscillator signal is then applied to its respective zero-crossing detector 27–29. Signals indicative of zero crossings are applied to a first input of their respective gates 34–35 and are employed to open gates 34–35, respectively, in a quadrature sequence. Photodetector 17, which is aligned to receive the light beams emanating from the triangular optical ring 16 of FIG. 1, is connected through amplifier 22 to a second input of gates 34–36. The outputs of gates 34–36 are connected to averaging circuits 41–43 respectively. The outputs of averaging circuits 41 and 42 are applied to analog indicator 61 which produces and indication of the difference betweeen the value of the signal from gate 34 (gate A) and the signal from gate 35 (gate B). The signals from averaging circuits 41 and 42 are also applied to comparator 51 which produces a binary signal (as will be further described with relation to FIG. 5a) which is representative of the relative polarity difference between the signals from gates A and B. Similarly, the outputs of averaging circuits 42 and 43 are applied to analog indicator 62 which produces an indication of the difference between the value of the signals from gates B and C. The signals from averaging circuits 42 and 43 are also applied to comparator 52 which produces a binary signal (as will be further described with relation to FIG. 5b) which is representative of the polarity difference betwen the signals from gates B and C. The output of comparator 51 produces a bistable signal (A–B) as shown in FIG. 5a which indicates at the "0" level (B greater than A) that the analog output lies in the region $0°$ to $-180°$ or alternate regions of $180°$, whereas the "1" level (A greater than B) indicates that the analog signal is in the region $0°$ to $+180°$ or alternate regions of $180°$. Comparator 52 produces a binary output (B–C) as shown in FIG. 5b wherein the transition regions are $90°$ displaced from those of the A–B signal. Hence for the B–C signals a "1" (B greater than C) indicates a region of $-90°$ to $+90°$ or alternate regions of $180°$, while a "0" (C greater than B) indicates a region of $+90°$ to $+270°$ or alternate regions of $180°$. The signal from comparator 51 is connected to input 53 of switchable pulse inverter 55 while comparator 52 is connected to input 54 of inverter 55 which generates pulses for properly driving bi-directional counter 56 in either of two directions so that its count is either increased or decreased depending upon whether the system rotation is increasing or decreasing through successive quadrants. The count stored by the counter is indicative of the particular phase region wherein the analog readings of indicators 61 and 62 lie.

Figure 3:
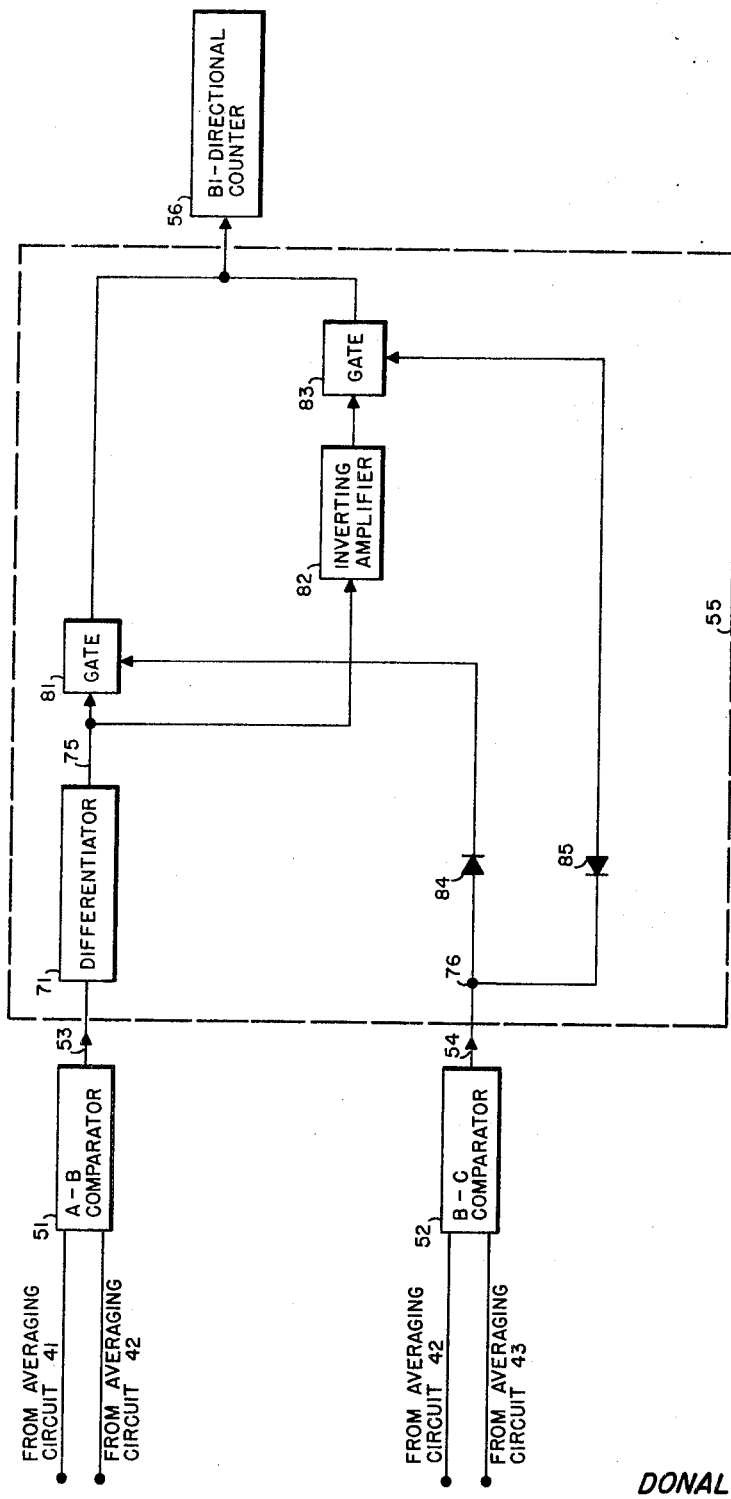
FIG. 3 is a circuit diagram of the switchable pulse inverter employed in the gating and comparison circuit.

FIG. 3 illustrates the relationship between the comparator circuits (51 and 52), differentiator 71, switchable pulse inverter 55 and bi-directional counter 56, together with a specific illustration of switchable pulse inverter 55. Comparator 51 compares the output signals from averaging circuits 41 and 42 (FIG. 2). The output signal of comparator 51 is fed to a differentiator 71 which produces a positive-going pulse for the positive going edge of the comparator output signal and a negative-going pulse for the negative-going edge of the comparator output signal. Differentiator 71 is connected by line 75 to gate 81 and also through inverting amplifier 82 to a gate 83. Gates 82 and 83 are controlled by the output signal of comparator 52. When the output signal of comparator 52 at line 76 is positive, it is passed by diode 84 to the control input of gate 81, whereas a negative signal at the output of comparator 52 is passed by diode 85 to the control input of gate 83. Thus, a positive pulse at line 75 is passed through gate 81 as a positive pulse if it occurs during a time when the output of comparator 52 is positive. A positive pulse on line 75 is inverted by inverting amplifier 82 and passed as a negative pulse by gate 83 if it occurs when line 76 is negative. Similarly, a negative pulse at line 75 is passed by gate 83 as a positive pulse if it occurs when line 76 is negative. The positive and negative pulses produced at the outputs of gates 81 and 83 are fed to a conventional bi-directional counter 74 having circuitry for separating the positive and negative pulses so that receipt of a positive pulse causes the counter to increase the count while receipt of a negative pulse causes the counter to decrease the count.

Figure 4:
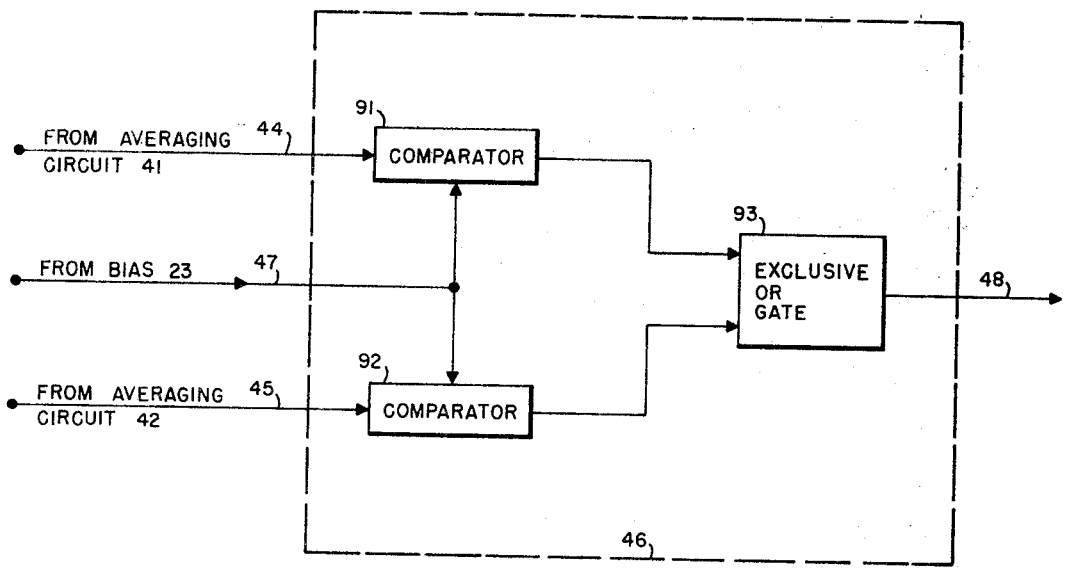
FIG. 4 is a circuit diagram of the analog indication designator of the gating and comparison circuit.

FIG. 4 is a schematic diagram of analog indication designator 46 which rceives the averaged outputs from gates A and B (FIG. 2) and compares them with the bias level from bias source 23 which is applied to amplifier 22. Analog indication designator 46 comprises a D.C. comparator 91 having a first input connected to the output of averaging circuit 41 and a second input connected to bias line 47, and a D.C. comparator 92 having a first input connected to the output of averaging circuit 42 and a second input connected to bias line 47. Comparator 91 compares the averaged output of gate A (FIG. 2) with the zero reference bias of line 47 while comparator 92 compares the averaged output of gate B with the zero reference bias of line 47. Comparators 91 and 92 operate in the same manner as comparators 51 and 52 of FIG. 2 and provide a "1" or a "0" output depending upon the relative polarity of the inputs. A "1" occurs at the output of comparator 91 if the averaged signal from gate A is greater than the bias level, while a "0" occurs if the averaged signal from gate A is less than the bias level. Similarly, a "1" occurs at the output of comparator 92 if the averaged signal from gate B is greater than the bias level while a "0" occurs if that signal is less than the bias level. Each of the outputs of comparators 91 and 92 is coupled to an input of exclusive OR gate 93 which produces a "1" output whenever the comparator outputs are both "1" or both "0." If the comparator outputs are dissimilar, then the output of exclusive OR gate 93 is "0." The output of gate 93 serves to indicate which analog indicator output is valid. For an automated designation, each of the indicators 61 and 62 (FIG. 2) is made responsive to either a "1" or "0" output from gate 93 (which is the output of the analog indication designator 46 of FIG. 2). In the automated system indicator 61 is energized through line 48 when the output of designator 46 is a "1", i.e., when the averaged outputs of gates A and B are either both above or both below the bias level. When one of the outputs of gates A and B is above and the other below the bias level, then analog indicator 62 is used. In certain applications, the designation of indicator 61 or 62 may be simply implemented by turning on a light associated with one of the two indicators 61 or 62.

Figure 6A:
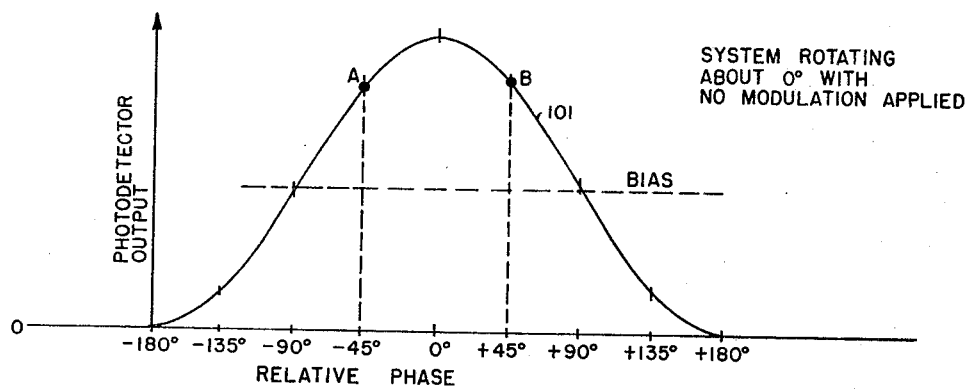

In operation, the beam of light from laser source 11 is directed through attenuating means 12 toward mirror 13 where the beam is split into two beams 8 and 9 which travel around the closed triangular ring in opposite directions but along identical paths and are then recombined to produce an interference pattern. In the stationary condition, photodetector 17 senses no difference in phase between the two counterrotating beams so that the photodetector output is at a maximum as shown at 0° by curve 101 of FIG. 6a. Since an increase in rate of rotation causes a greater phase difference between the light beams, the photodetector output signal varies as illustrated by curve 101 of FIG. 6a. Since the output of photodetector 17 is a unipolar, cosine-squared waveform, a bias level derived from a fixed D.C. source 23 is used to establish a reference level such that the output is converted to a cosine, starting at a positive maximum when the system is in the rest condition, and then varying through zero to a negative maximum of equal magnitude in accordance with the system rotation rate. The resultant waveform is therefore centered about the bias level derived from bias source 23. The curve of FIG. 6a covers rotation rates wherein the relative phase difference of the light beams is in the region of −180° to +180°. The region 0° to +180° indicates increasing rotation in the positive direction while the region 0° to −180° indicates increase rotation in the opposite or negative direction. FIG. 6a reveals an ambiguity of direction occurring about the rest position (0°), as indicated by the value at points A and B, which also repeats every 360° for either positive or negative rotation. In order to resolve this direction ambiguity, and to provide an indication of the proper region of phase shift, the light beams are phase modulated in the interferometer ring and then detected at the photodetector output.

When the light beams are phase modulated by means of electro-optic modulator 18 (FIG. 1) at the frequency of oscillator 19 the beams 8 and 9 are phase shifted equally by being advanced or retarded according to the polarity of the sinusoidal voltage of oscillator 19. Both beams are phase shifted simultaneously so that a phase shift results at detector 17. For a system at rest having the modulating signal applied, the photodetector output is as shown in FIG. 6b and is similar to a photodetector output of a non-modulated system being rotated about the rest position (0° phase shift) in both directions. Thus, for example, if beam 8 of FIG. 1 leads beam 9 by 180° at the positive maximum of the modulating signal the photodetector output is at a minimum. At the negative maximum of the modulating signal beam 8 will lag beam 9 by 180° and the photodetector output is again at a minimum. FIG. 6b therefore illustrates the variations of the photodetector output with the phase modulating signal applied to a system at rest. Points A, B, and C on curve 101 indicate the times when the photodetector signal is gated by pulses indicative of the zero-crossings of the phase shifted oscillator signal which occur 90° apart, i.e., at −45°, +45°, and +135°. The values at points A and B of curve 101 in FIG. 6b are equal, so that no relative phase shift between the light beams due to rotation is indicated.

The output of zero-crossing detector 27 opens gate 34 (gate A) at the zero-axis crossing of the phase-shifted oscillator signal which corresponds to the value of the photodetector output at time A. Similarly, gate 35 (gate B) is opened by zero-axis crossing of a phase-shifted oscillator signal which corresponds to the value of the photodetector output at time B. The values A and B passed by gates 34 and 35 are averaged by circuits 41 and 42, respectively, and compared by analog indicator 61. For the non-rotating system (FIG. 6a,) the analog indicator 61 shows a null since the values A and B are equal. These averaged values A and B are also applied to comparator 51 which produces the binary signal of FIG. 5a. It is seen from FIG. 5a that the output of comparator 51 is at a transition point when the values at A and B (FIG. 6b) are equal.

Figure 6C:
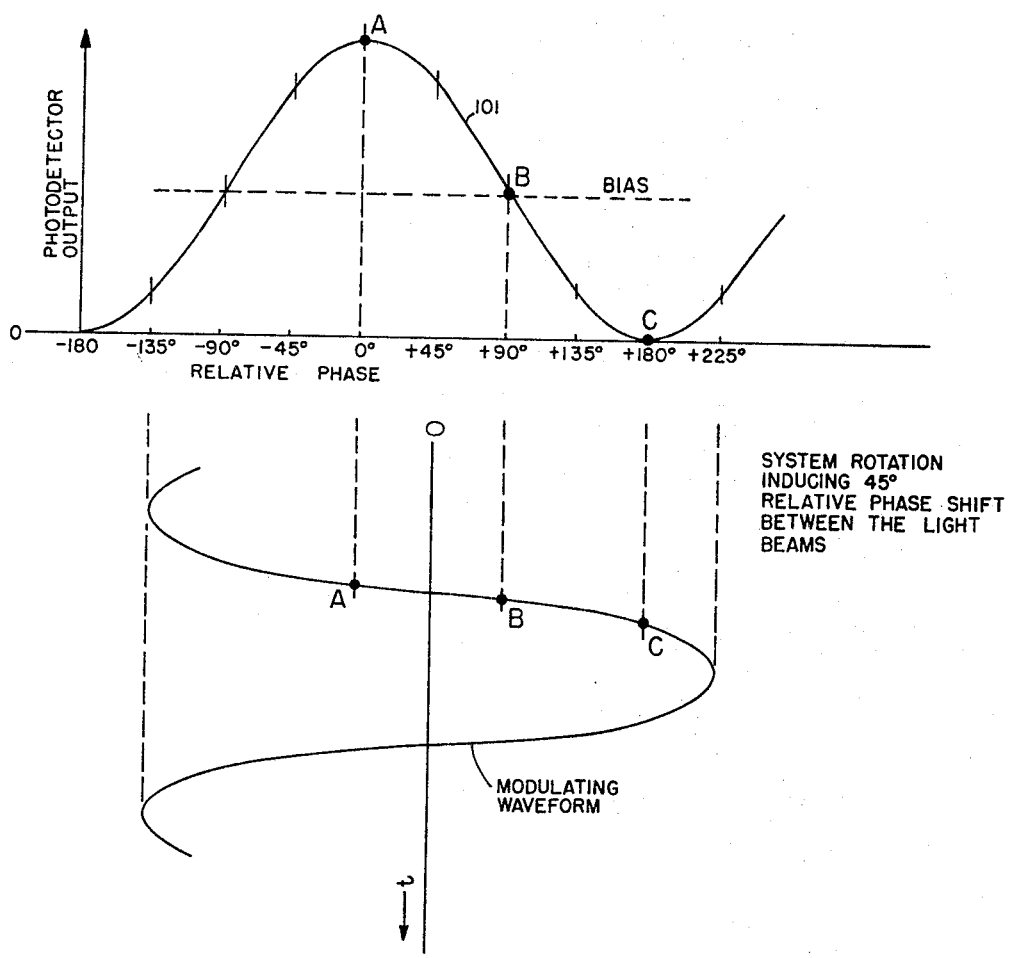

If the system is rotated in the positive direction at a constant rate which causes the light beams 8 and 9 (FIG. 1) to be displaced by 45°, the photodetector output at time A increases as shown in FIG. 6c while the photodetector output at time B decreases. The values compared by analog indicator 61 are now unequal, i.e., the value from gate A is greater than the value from gate B so that the analog indication is in the positive region of the scale. The values are unequal by an amount which is a function of the system rotation rate and the polarity of the difference between the values indicates direction of rotation.

The difference between the values A and B reaches a positive maximum when the rate of rotation of the system reaches that which will cause the recombined light beams to differ in phase by 90°. A further increase in rotation to 180° causes the value at points A and B to be equal again thus creating an ambiguity. This ambiguity is present beyond the first ±90°. Since the magnitude of the difference is proportional to the sine of the phase angle, only the first ±45° is reasonably linear. To resolve this ambiguity, the value C of curve 101 in FIGS. 6b through d, which is passed by gate C (which is opened by the zero-axis crossing of the +135° phase-shifted signal from oscillator 19), is compared with the value B. FIG. 6d, as well as FIG. 5b indicates that when the system is rotated to shift the recombined light beams by 90°, the values B and C are equal so that averaging circuits 42 and 43 (FIG. 2) have equal averaged outputs. In the phase region between −45 and 0° the difference between the values A and B varies from a negative value to zero. As the phase angle increases past 0° toward +45°, the difference between the values A and B varies from zero to a positive value. The difference between the values A and B is reasonably linear over the range −45° to +45°, and, of course, alternating ranges of 180°. Similarly, in the region between +45 and +90° the difference between the values B and C varies from a negative value to zero. As the phase angle between the light beams goes beyond 90° toward 135°, the difference between the values B and C goes positive. In the region between +45° to +135°, and alternate intervals of 180° the difference between the values B and C is reasonably linear thus complementing the difference in the values A and B over the linear region of −45° to +45°. These more linear regions therefore alternate so that an accurate continuous coverage of the angular rotation rate is provided.

In order to properly utilize these more linear regions, an analog indication designator 46 performs the function of designating the indicator (61 or 62) having the output for the linear region. Designator 46 provides an output which indicates whether A and B are both above or both below the bias level, or whether one value is above and the other below the bias level. If both are above or below the bias level, indicator 61, which compares A and B, is designated. The times when A and B are both above or below the bias level correspond to the linear region −45° to +45° for A and B referred to above. Similarly, the times when A and B are on opposite sides of the bias level correspond to the linear region +45° to +135° for B-C. During those times, therefore, indicator 62 is designated as having the valid indication.

Since the readings of indicators 61 and 62 repeat beyond the −180° to +180° region, a means for resolving ambiguity is provided in the nature of bi-directional counter 56. Bi-directional counter 56 indicates and stores a count which is indicative of the particular phase region to which the readings of analog indicators 61 and 62 relate. This count increases as the system rate of rotation increases and decreases when system rate of rotation decreases.

If the optical gyroscope of this invention must determine the absolute rotation rate from a power-off start, the operation of oscillator 19 is changed to a swept-frequency mode which increases from the lowest to the highest frequency of a frequency range encompassing the maximum system rotation rate anticipated. As the frequency increases, bi-directional counter 56 records the quadrants of phase-shift passed in bringing the oscillator up to its normal operating frequency.

In summary, the invention provides an optical gyroscope employing a triangular interferometer having a laser source and means for modulating the counterrotating light beams in the interferometer ring so that a photodetector receiving the recombined light beams produces at its output a signal which is synchronously sensed by a circuit which unambiguously indicates rate of rotation and direction of rotation of a system.

Only a single plane of rotation may be sensed at any given time with the system as described and illustrated. Additional sensing for more than one plane of rotation obviously requires an interferometer and related system for each additional plane of rotation. For simultaneous sensing in three planes, therefore, three of the systems shown in FIG. 1 are required. However, a single common laser source and a single common oscillator may be employed. Where a common laser source is employed for the three systems, a beam dividing means is used to direct ⅓ of the laser beam into each system.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for measuring rotational motion and for sensing the direction of the rotational motion comprising:
   a source of light;
   beam-splitting means for dividing said beam of light from said source into two beams of light;
   at least two light reflecting means displaced from said beam-splitting means and positioned with respect to said beam-splitting means to form an optical ring, wherein one of said light beams travels in a clockwise direction and the other of said light beams travels in a counterclockwise direction, said two beams being recombined at said beam-splitting means;
   means responsive to said recombined light beams for producing a signal representative of the recombined beams;
   means for phase modulating said light beams;
   means coupled to said means responsive to said combined light beams and to said means for phase modulating said light beams, for varying the degree of phase modulation applied to said light beams by said phase modulating means and for sampling and signal representative of the recombined beams when said phase modulating means is applying any of at least three degrees of phase modulation to said light beams to thereby provide at least three sample values;
   means for comparing at least the first and second sampled values to provide a first compared signal and the second and third sampled values to provide a second compared signal; and
   means for comparing said first and second compared signals to produce a signal indicative of the rate of rotation of said system and the direction of said rotation.

2. The system of claim 1 wherein said light source comprises a source of collimated, coherent, monochromatic light.

3. The system of claim 2 wherein said means for phase modulating said light beams comprises an electro-optic modulator positioned in said ring, and wherein said means for varying the degree of phase modulation and for sampling said signal representative of the recombined beams includes oscillating means for exciting said electro-optic modulator.

4. A system for sensing and measuring rate of rotation and direction of rotation of said system comprising:
   a source of light;
   beam-splitting means for dividing said light from said source into two beams of light;
   two light reflecting means displaced from said beam-splitting means and positioned with respect to said beam-splitting means to form a triangular optical ring, wherein one of said light beams travels in a clockwise direction and the other of said light beams travels in a counterclockwise direction, said two beams being recombined at said beam-splitting means;
   light detecting means for receiving said recombined light beams and for producing an output signal indicative of said recombined beams;
   modulating means positioned adjacent said beam-splitting means for shifting the phase of both of said two beams;
   oscillating means for producing a signal for exciting said modulating means;
   first, second and third phase-shifting means connected to said oscillating means for shifting the phase of said signal produced by said oscillating means;
   first, second and third gates, each of said gates coupled to one of said phase-shifting means and said light detecting means for gating said signal produced by said light detecting means;
   first, second and third means coupled between each of said gates and its respective phase-shifting means for enabling its respective gate to pass the light detecting means signal at a predetermined level of said oscillating means signal;
   first comparator means for receiving the signals gated by said first and second gates to thereby produce a binary output signal representative of the relationship between the signals gated by said first and second gates; and
   first indicator means for receiving the signals from said first and second gates to thereby produce an analog indication of the relationship between the signals gated by said first and second gates which represents both the rate and direction of rotation of said system within a first plurality of ranges of rotation rates.

5. A system as set forth in claim 4 further including a second comparator means for receiving the signals gated by said second and third gates to thereby produce a binary output signal representative of the relationship between the signals gated by said second and third gates and
   second indicator means for receiving the signals from said second and third gates to thereby produce an analog indication of the relationship between the signals gated by said second and third gates which represents both the rate and direction of rotation of said system within a second plurality of ranges of rotation rates.

6. A system as set forth in claim 5 further including means receiving the signals gated by said first and second gates for producing a signal indicative of the accuracy of said first and second indicator means.

7. A system as set forth in claim 6 further including circuit means for receiving the binary outputs of said first and second comparator means and for producing an output pulse signal when the binary output of one of said first and second comparator means changes its value, having a polarity representative of the direction of the rate of change of the rotation rate of said system.

8. A system as set forth in claim 7 further including means receiving the output pulse signal from said circuit means for storing a count which increases by one unit when the polarity of the output pulse signal from said second means is positive and decreases by one unit when the polarity of said signal is negative.

9. A system for sensing and measuring rate of rotation and direction of rotation of said system comprising:
   a source of light;
   beam-splitting means for dividing said light from said source into two beams of light;
   light reflecting means displaced from said beam-splitting means and positioned with respect to said beam-splitting means to form a triangular optical ring, wherein one of said light beams travels in a clockwise direction and the other of said light beams travels in a counterclockwise direction, said two beams being recombined at said beam-splitting means;
   light detecting means for receiving said recombined light beams and for producing an output signal indicative of said recombined beams;
   modulating means for shifting the phase of both of said two beams;
   oscillator means for exciting said modulating means;
   first, second and third phase-shifting means for shifting the phase of said signal produced by said oscillator means, wherein the phase-shift provided by said second phase-shifting means is in quadrature relation to the phase-shift provided by said first and third phase-shifting means;
   first, second and third zero-crossing detectors coupled to receive the phase-shifted signal from the first, second and third phase-shifting means, respectively, each of said zero-crossing detectors producing a signal indicative of the zero-crossing of its received signal;
   first, second and third gates, each of said gates having a first input coupled to receive the signals from its respective zero-crossing detector, and each of said gates having a second input coupled to receive the signal produced by said light detecting means, so that a light detecting means signal is transmitted to the output of each gate at the zero-crossing of its respective phase-shifted signal;
   first, second and third averaging means coupled to receive the gated signal of said first, second and third gating means, respectively;
   first comparator means coupled to said first and second averaging means for producing a binary output representative of the relationship between the signals gated by said first and second gates;
   second comparator means coupled to said second and third averaging means for producing a binary output respresentative of the relationship between the signals gated by said second and third gates;
   first indicator means coupled to said first and second averaging means, for indicating the relationship between said signals gated by said first and second gates which represents both the rate and direction of rotation of said system within a first plurality of ranges of rotation rates; and
   second indicator means coupled to said second and third averaging means, for indicating the relationship between the signals gated by said second and third gates which represents both the rate and direction of rotation of said system within a second plurality of ranges of rotation rates.

10. The system as set forth in claim 9 further including circuit means for receiving the binary outputs of said first and second comparator means and for producing an output pulse signal when the binary output of one of said first and second comparator means changes its value, having a polarity representative of the direction of the rate of change of the rotation rate of said system.

11. The system as set forth in claim 10 further including means receiving the output pulse signal from said circuit means for storing a count which increases by one unit when the polarity of the output pulse signal from said second means is positive and decreases by one unit when the polarity of said signal is negative.

12. The system as set forth in claim 11 further including means receiving the signals gated by said first and second gates for producing a signal indicative of the accuracy of said first and second indicator means.

References Cited

UNITED STATES PATENTS

| | | | |
|---|---|---|---|
| 3,392,622 | 7/1968 | Senf | 356—106 |
| 3,395,270 | 7/1968 | Speller | 356—106 |
| 3,102,953 | 9/1963 | Wallace. | |
| 3,233,108 | 2/1966 | Rosenblum. | |
| 3,345,912 | 10/1967 | Lohmann. | |

OTHER REFERENCES

King, P. G. R., Rotation Detection With A "Ring-Laser," Contemporary Physics, vol. 5, 1964, pp. 280–3.

RONALD L. WIBERT, Primary Examiner

V. P. McGRAW, Assistant Examiner

U.S. Cl. X.R.

250—200